Figure 1:
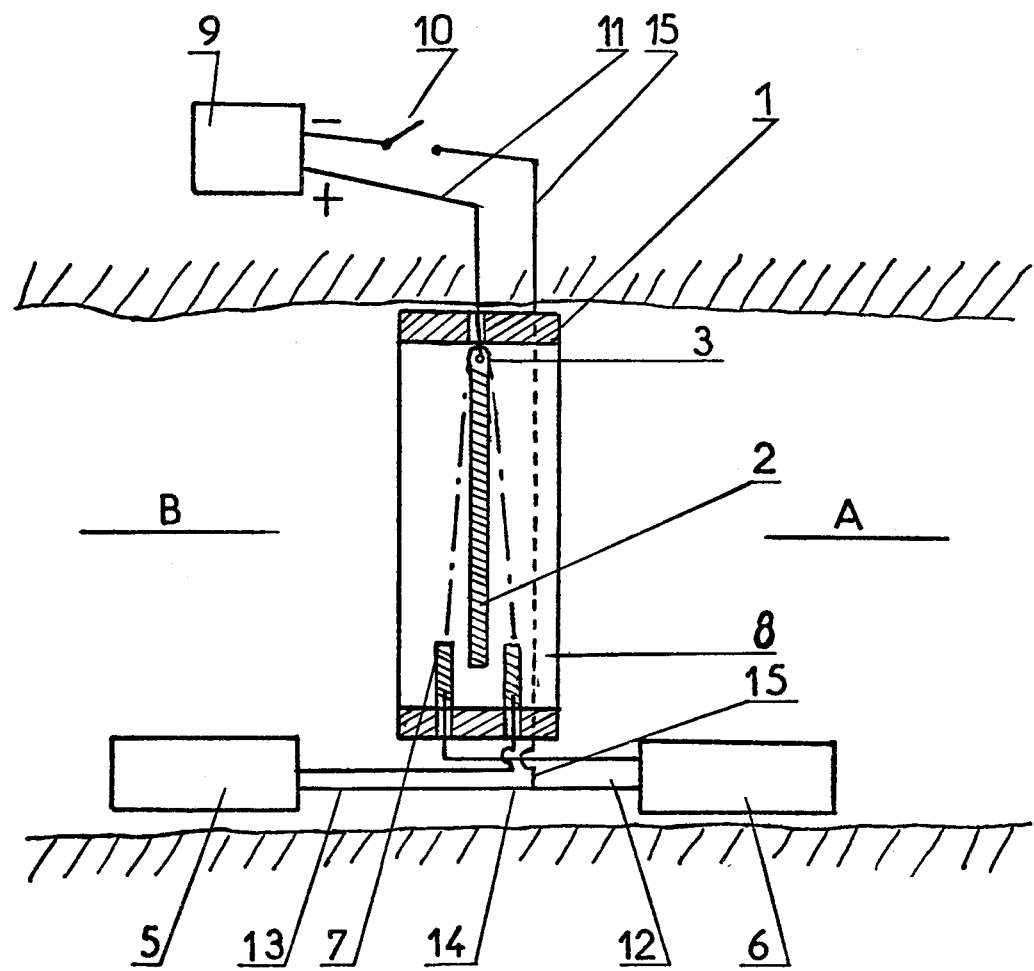

United States Patent [19]

Denninger et al.

[11] 4,213,265
[45] Jul. 22, 1980

[54] EXPLOSIVE TRAP FOR ANIMALS

[75] Inventors: Claude Denninger, Chazay d'Azergues; Louis Moutton, Craponne, both of France

[73] Assignee: SOGEMARIC, Societe de Gestion et de Marketing pour Industries de Consommation, Ecully, France

[21] Appl. No.: 940,143

[22] Filed: Sep. 6, 1978

[30] Foreign Application Priority Data

Sep. 19, 1977 [FR] France .................. 77 28677

[51] Int. Cl.² .......................................... A01M 27/00
[52] U.S. Cl. ...................................................... 43/84
[58] Field of Search ............................. 43/84; 102/8

[56] References Cited
U.S. PATENT DOCUMENTS

| 2,809,464 | 10/1957 | Sutton | 43/84 |
| 4,109,406 | 8/1978 | Denninger | 43/84 |

Primary Examiner—Othell M. Simpson
Assistant Examiner—Roscoe V. Parker
Attorney, Agent, or Firm—Browdy and Neimark

[57] ABSTRACT

A pyrotechnical mole trap includes
an open-ended protective envelope which is intended to be placed in the mole run,
a displaceable trigger of electrically conductive material disposed in the center of the protective envelope and displaceable in both directions to contact one of two contacts and close a circuit,
two electrically fired deflagrating explosive charges, of which each is placed on the outside of the protective envelope,
a source of electric energy,
an electrical circuit which connects together the trigger, the electrical contact, the explosive charges and the source of electrical energy and which is wired in such a way that the action of the mole on the trigger closes the electrical circuit and fires the explosive charge situated on the animal side of the trigger.

10 Claims, 2 Drawing Figures

EXPLOSIVE TRAP FOR ANIMALS

This invention relates to an explosive trap for animals.

More particularly, this invention relates to an explosive trap for the destruction of moles and other harmful animals of similar size and behaviour. Various means have already been proposed for the destruction of moles, for example, poisoned bait, poison gases and anti-mole pistols, but none of them has proved to be entirely satisfactory, in addition to which they involve serious risks to the user.

It has also been proposed to destroy moles in their runs by the explosion of electrically fired explosive charges. In mole traps of this type, the action of the mole on a trigger actuates an electrical contactor of which the closure causes one or more explosive charges to be fired and exploded through an electrical circuit. Thus, U.S. Pat. No. 2,809,464 describes an explosive trap comprising a trigger, in the form of a plate, actuating an electrical contactor which itself is connected to an electrically fired detonating charge by an electrical circuit comprising a source of electrical energy. When this trap is positioned in the mole run, the action of the mole on the trigger causes the detonating explosive charge to explode through the contactor and the electrical circuit. The main disadvantage of this trap is that it uses as its explosive charge a detonating charge of which the explosion is highly dangerous to the user and to domestic animals and which results in mutilation of the mole.

Another serious disadvantage of this trap is that it can only operate successfully if the mole, moving along its run, comes into contact with the trap on that side of the trap where the plate is situated because a mole coming into contact with the trap on the side opposite the side where the plate is situated will not suffer any injury, thereby resulting in a significant percentage of failures in the use of this trap. Also see U.S. Pat. No. 4,109,406.

The present invention enables these disadvantages to be obviated.

Thus, the present invention provides an electrically fired explosive trap comprising:
(a) an open-ended, preferably cylindrical, protective envelope which is adapted to be placed inside an animal run,
(b) a displaceable trigger of which at least part is composed of a electrically conductive material disposed within and positioned centrally of the protective envelope thereof and which is capable of being displaced inside the protective envelope from a central position or safety position towards two end positions situated on either side of the central position,
(c) two electrically fired deflagrating explosive charges each disposed externally of one of the ends of the protective envelope,
(d) two electrical contact stops made of an electrically conductive material which are integral with and disposed within the protective envelope on either side of the trigger so that part of the displaceable central trigger which is made of electrically conductive material comes into contact with one or other of these two stops when the trigger moves from the central position into one or other of the end positions situated on either side of this central position,
(e) a source of electrical energy,
(f) an electrical circuit which connects together the electrically conductive part of the trigger, the explosive charges, the electrical contact stops and the source of electrical energy and which is wired so that the action of an animal on any of the faces of the central trigger results in closure of the electrical circuit and in firing of the explosive charge situated on that side of the trigger where the animal has exerted its action.

The trap according to the present invention, which is particularly suitable for use as a mole trap has the following advantages:
it does not involve any danger either to the user or to domestic animals,
its effectiveness on the mole is extremely high, often of the order of 100%,
it kills the moles instantaneously without multilation, burning or any significant external lesion which enables the mole skins to be subsequently used, for example in skin dressing.

We have found that moles are relatively delicate animals which do not stand up very well to shocks and that it is possible to kill them easily by the shock wave created by the explosion of a deflagrating explosive charge of very low power in accordance with the present invention.

It is therefore possible to destroy moles by the explosion of deflagrating explosive charges which are harmless to the user and to domestic animals, in contrast to detonating explosive charges which may involve a certain risk to both.

Figure 2:
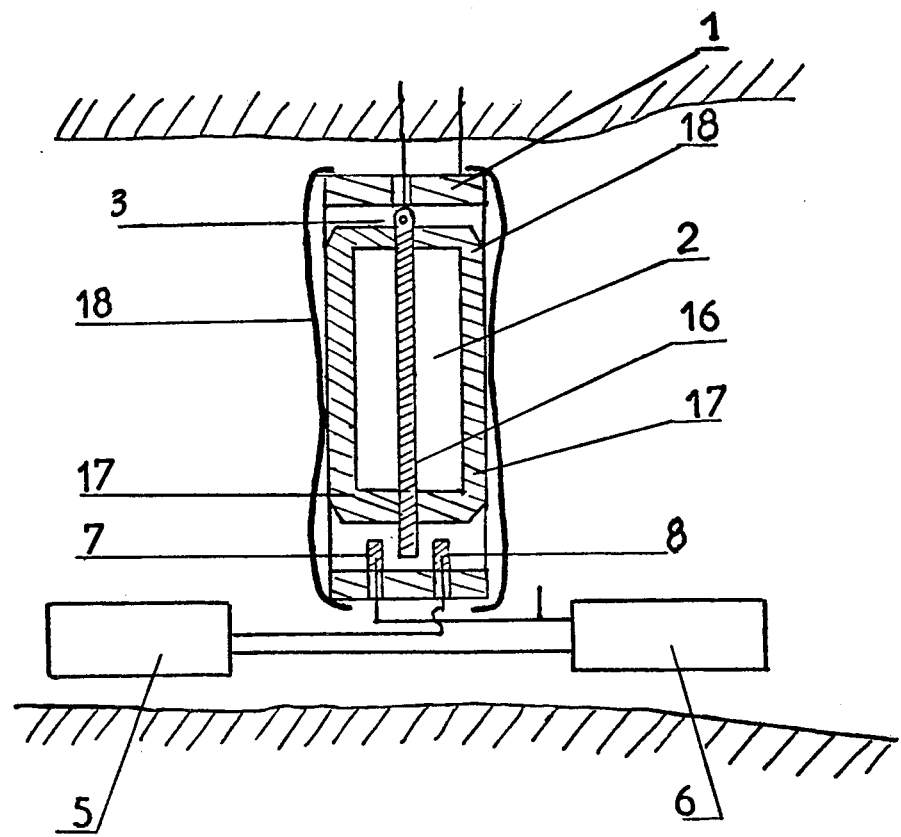

The invention is illustrated by the accompanying drawings in which:

FIG. 1 is an elevation, partly in section, of one embodiment of a trap according to the present invention shown in position in a mole run; and FIG. 2 is an elevation, partly in section, of a portion of another embodiment of a trap according to the present invention, shown in position in a mole run.

FIG. 1 illustrates in section a protective envelope 1 of cylindrical form, a central displaceable trigger 2 being in the form of a substantially circular metallic plate. The displaceable central trigger 2, shown here in section, is adapted to pivot about a pin 3 to move from a so-called central or safety position, in which it is shown, into two end positions represented by chain lines in FIG. 1. The pivoting of the trigger 2 about the pin 3 preferably brings into play frictional forces such that a pressure has to be applied to this trigger to move it from the safety position into one or other of its end positions. The trap according to the invention as illustrated in FIG. 1 also comprises deflagrating explosive charges 5 and 6, electrical contact stops 7 and 8, a dry cell constituting a source of electrical energy 9 and a safety switch 10 intended to switch on the energy source 9 once the trap is in position. A conductor 11 connects one of the terminals of the energy source 9 (in this case the +terminal) to the electrically conductive trigger 2. The electrical contact stop 7 is connected by the conductor 12 to one of the terminals of the explosive charge 6. The contact stop 8 is connected to one of the terminals of the explosive charge 5 by a conductor 13. The other terminals of the explosive charges 5 and 6 are connected together by the conductor 14 which itself is connected to the other terminal of the energy source 9 (in this case the − terminal) by the conductor 15.

The trap shown in FIG. 1 operates as follows: once it has been positioned in the mole run, the assembly formed by the protective envelope 1, its contents and the explosive charges 5 and 6, the trigger 2 being in the so-called "safety" position shown in the drawing, and once the various electrical connections have been established, the operator closes the safety switch. The mole or harmful animal of similar size moving along its run will come into contact with one or other of the faces of the trigger 2. Thus, in the case of a mole arriving in the direction marked A in FIG. 1, the action of the mole on the trigger 2 displaces the trigger 2 and brings it into contact with the stop 7. The electrical connection thus established between the electrically conductive elements 2 and 7 closes the electrical circuits for firing the explosive charge 6 which explodes in the immediate vicinity of the harmful animal and kills it. Similarly, a mole arriving in the direction marked B in FIG. 1 and coming into contact with the trigger 2 will bring this trigger into contact with the stop 8 and cause the explosive charge 5 to explode.

FIG. 2 shows a variant of the trap illustrated in FIG. 1. In FIG. 2, only that part of the trap which is intended to be positioned in the mole run has been shown. The references 1, 3, 5, 6, 7 and 8 have the same meanings as in FIG. 1. The reference 2 generally denotes the displaceable central trigger formed by one part of an electrically conductive material, in the form of a substantially circular metallic plate 16, and by two parts 17 of an electrically non-conductive material which are integral with a metallic plate 16. Flexible membranes 18, for example based on rubber are fixed to the protective envelope and, in its central part, comes into contact with one of the faces of the central trigger. The mode of operation of the trap shown in FIG. 2 is entirely identical with that of the trap shown in FIG. 1. It can be seen that the arrangement shown in FIG. 2 makes the trap completely impervious.

In the embodiments illustrated in FIGS. 1 and 2, the action of the mole on one of the faces of the trigger 2 results in the explosion of only one of the explosive charges. However, it is possible in accordance with the invention to modify the wiring of the electrical circuit, for example by directly interconnecting the electrical contact stops 7 and 8 by an electrically conductive material so that the action of the mole on one of the faces of the central trigger 2 results in the simultaneous explosion of both explosive charges.

According to the invention, the cylindrical protective envelope is preferably in the form of a cylinder of revolution. Its transverse dimension should be substantially equal to the width of a mole run. Its axial length is preferably less than its transverse dimension.

Each of the explosive charges used in accordance with the invention is formed on the one hand by a deflagrating explosive composition and on the other hand by an igniter ignited by Joule effect,* the igniter firing the explosive composition. A composition containing from 0.1 to 1 g of black powder is preferably used as the explosive composition. The igniter which fires the explosive composition has the following characteristics:

its ohmic resistance is between 0.1 and 3 ohms,
the initial current intensity amounts to between 0.1 and 2 amps.

*sometimes called an electric firing element

Preferably, each of the explosive charges is accommodated in a casing made either of a lightweight alloy, for example based on aluminium or of a polymeric material. In one preferred embodiment, each of the explosive charges is removably secured to the cylindrical protective envelope so that spent charges may readily be replaced. In the embodiment shown in FIG. 1, the source of electrical energy is in the form of a dry cell. Nevertheless, it will be appreciated that this source could be formed by any other suitable source of electricity and, in particular, by the mains voltage.

It will be noted that the use of low-power deflagrating charges except for detonating charges as the explosive charges provides for complete safety in use so that the trap does not involve any real danger either to man or to animals larger in size than the mole. The explosion of these explosive charges kills moles instantaneously without any mutilation, burning or significant external lesions. Another advantage of the trap according to the invention is that once it has been positioned inside the mole run, it operates whatever the direction of arrival of the mole, which affords it maximum effectiveness. It will be noted that the displaceable trigger is arranged in the central part of the cylindrical envelope and that this arrangement affords it very satisfactory protection against inadvertant blockage due for example to earth. It will also be noted that the displaceable central trigger of the trap according to the invention acts on the one hand as a trigger capable of being actuated in two opposite directions and on the other hand, in co-operation with the electrical contact stops, as an electrical contactor. This particularly simple design of the displaceable central trigger enables the trap according to the invention to be manufactured under particularly favourable conditions from the economic point of view.

Although the trap according to the invention is particularly intended for the destruction of moles, it will be appreciated that it may also be used for the destruction of other types of harmful animals comparable in size and behavior behaviour with the mole.

It is obvious that the invention is not limited to the embodiments which have been described and that numerous modifications may be made without departing from the scope of the invention.

What we claim is:

1. An electrically fired explosive animal trap consisting essentially of:
   (a) an open-ended, protective tubular envelope which is adapted to be placed inside an animal run, the diameter of said envelope being greater than its length,
   (b) a displaceable trigger and movable electrical contact of which at least part is composed of an electrically conductive material disposed within and positioned in the central part of the protective envelope and which is capable of being displaced inside the protective envelope from a central position towards two end positions situated on either side of the central position,
   (c) two electrically fired deflagrating explosive charges each disposed externally of one of the ends of the protective envelope,
   (d) two electrical contact stops of an electrically conductive material which are integral with and disposed within the protective envelope on either side of the trigger so that part of the displaceable central trigger which is made of electrically conductive material comes into contact with one or other of these stops when the trigger moves from the central position into one or other of the end positions situated on either side of this central position, (e) a source of electrical energy, and (f) an electrical circuit connecting together the electrically conductive part of the trigger, the explosive charges, the electrical contact stops and the source of electrical energy, and wired so that the action of an animal on any of the faces of the central trigger results in closure of said electrical circuit and in firing of the explosive charge situated on that side of the trigger where the animal has exerted such action.

2. An electrically fired, explosive animal trap as claimed in claim 1, wherein each of the deflagrating explosive charges is formed of a low-explosive composition and an electrically fired igniter.

3. An electrically fired, explosive animal trap as claimed in claim 2, wherein each said low-explosive composition comprises black powder in a quantity of from 0.1 to 1 gram.

4. An electrically fired, explosive animal trap as claimed in any of claims 1 to 3, wherein each explosive charge is accommodated in a case comprising a lightweight alloy or polymeric material which is releasably fixed to the cylindrical protective envelope.

5. An electrically fired explosive animal trap as claimed in any of claims 1 or 2, wherein the electrical circuit connecting the source of electrical energy to the part intended to be placed inside the animal run comprises a safety switch intended to switch on the source of electrical energy once the trap has been placed in position.

6. An electrically fired explosive animal trap as claimed in any of claims 1 or 2, wherein the protective envelope is cylindrical and wherein the axial length of the cylindrical protective envelope is less than its transverse dimension.

7. An electrically fired, explosive animal trap as claimed in claim 6, wherein said trigger is pivotally suspended from said protective envelope.

8. An electrically fired explosive animal trap as claimed in claim 7, wherein said contact stops are mounted on the interior bottom of said envelope.

9. An electrically fired, explosive animal trap as claimed in claim 7, wherein said trigger is a substantially circular metallic plate.

10. In an electrically fired explosive trap for positioning in an underground animal tunnel, comprising a generally tubular envelope open at its ends, two electrically fired deflagrating explosive charges each of which is disposed externally of one of the ends of the envelope, a source of electrical energy, electrical switch means, and an electrical circuit which connects the switch means with the explosive charges and the source of electrical energy, the improvement wherein said switch means comprises:

a displaceable trigger and movable electrical contact of which at least part is composed of an electrically conductive material disposed within and positioned in the central part of the tubular envelope and which is capable of being displaced inside the tubular envelope from a central position towards two end positions situated on either side of the central position; and two electrical contact stops of an electrically conductive material which are integral with and disposed within the tubular envelope on either side of the trigger so that part of the displaceable central trigger which is made of electrically conductive material comes into contact with one or other of these stops when the trigger moves from the central position into one or other of the end positions situated on either side of this central position;

said electrical circuit being wired so that the action of an animal on any of the faces of the central trigger results in closure of said electrical switch and in firing of the explosive charge situated on that side of the trigger where the animal has exerted such action.

* * * * *